United States Patent [19]

Nilssen

[11] Patent Number: 4,742,442
[45] Date of Patent: * May 3, 1988

[54] CONTROLLED MAGNETRON POWER SUPPLY INCLUDING DUAL-MODE INVERTER

[76] Inventor: Ole K. Nilssen, Caesar Dr., Rt. 5, Barrington, Ill. 60010

[*] Notice: The portion of the term of this patent subsequent to Oct. 13, 2004 has been disclaimed.

[21] Appl. No.: 875,073

[22] Filed: Jun. 17, 1986

[51] Int. Cl.⁴ .............................................. H02M 7/44
[52] U.S. Cl. ....................................... 363/98; 315/106; 315/102; 363/71
[58] Field of Search ................... 363/71, 97, 98, 132; 307/29; 315/102, 105–107, DIG. 5, DIG. 7

[56] References Cited

U.S. PATENT DOCUMENTS

| | | | |
|---|---|---|---|
| 3,392,309 | 7/1968 | Hickman | 315/102 |
| 4,076,996 | 2/1978 | Maehara et al. | 315/106 |
| 4,253,043 | 2/1981 | Chermin et al. | 315/106 |
| 4,256,992 | 3/1981 | Luursema | 315/105 X |
| 4,438,372 | 3/1984 | Zuchtriegel | 315/224 |
| 4,525,648 | 6/1985 | De Bijl et al. | 363/97 X |
| 4,593,167 | 6/1986 | Nilssen | 363/75 X |
| 4,620,078 | 10/1986 | Smith | 315/107 X |

Primary Examiner—Patrick R. Salce
Assistant Examiner—Marc S. Hoff

[57] ABSTRACT

For the magnetron in a microwave oven, a full-bridge inverter power supply comprises two pairs of switching transistors and is conditionally operable to self-oscillate in either of two modes: a first mode wherein one of the two pairs of switching transistors self-oscillates in manner of a half-bridge inverter and powers the magnetron's thermionic cathode, and a second mode wherein both pairs of transistors self-oscillate in manner of a full-bridge inverter and then provide the magnetron's anode power as well as its cathode heating power. The first mode gets initiated immediately upon applying power to the power supply, but the second mode does not get initiated until about 5 seconds after the initiation of the first mode. That way, the cathode will have become fully thermionic prior to applying anode power to the magnetron.

20 Claims, 1 Drawing Sheet

CONTROLLED MAGNETRON POWER SUPPLY INCLUDING DUAL-MODE INVERTER

BACKGROUND OF THE INVENTION

1. Field of Invention

The present invention relates to an inverter-type power supply for the magnetron in a microwave oven.

2. Prior Art

A magnetron has a thermionic cathode that must be brought to incandescence before the magnetron is properly operable to receive its main operating power.

When, as frequently is desirable to do, a magnetron is powered by way of being effectively parallel-connected with the tank capacitor of a high-Q resonant circuit that is series-excited by the voltage output of an inverter power supply, a problem arises: before the magnetron's cathode has reached incandescence, the magnetron is not properly operative to absorb power; which means that the high-Q resonant circuit is effectively unloaded and therefore represents an effective short circuit across the inverter's voltage output. This not only causes an excessively large power drain from the inverter, but also causes excessively large-magnitude voltages to develop across the circuit elements of the resonant circuit.

One way of circumventing this problem is that of providing the requisite cathode heating power from a separate source of power, and to delay the turning-on of the inverter power supply until after the magnetron's cathode have reached incandescence. However, this approach requires the use of an extra power supply, and is therefore not as cost-effective as might be desired.

SUMMARY OF THE INVENTION

Objects of the Invention

A basic object of the present invention is that of providing a cost-effective inverter-type power supply for a magnetron.

A more specific object is that of providing a cost-effective inverter power supply operative to power a magnetron that is effectively parallel-connected with a series-excited high-Q resonant L-C circuit, and wherein the magnetron requires conditioning prior to being able to operate properly as a load.

This, as well as other objects, features and advantages of the present invention will become apparent from the following description and claims.

Brief Description

A full-bridge inverter comprises a first and a second pair of seires-connected switching transistors connected across a source of DC voltage. The inverter is conditionally operable to self-oscillate in either of two modes: a first mode wherein the first pair of switching transistors self-oscillates in manner of a half-bridge inverter and powers a first load, and a second mode wherein both pairs of transistors self-oscillate in manner of a full-bridge inverter and then powers a second load in addition to the first load.

The inverter's self-oscillation is accomplished by way of positive current feedback using saturable current transformers connected in circuit with the loads. The first load is connected between the center-junction of the first pair of series-connected transistors and the center-junction of two series-connected capacitors connected across the DC source. The second load is connected between the center-junctions of the two pairs of series-connected transistors.

The inverter is of such nature as to have to be triggered into oscillation. By triggering one of the transistors in the first pair of transistors, that first pair of transistors starts self-oscillating action and operates as a half-bridge inverter in combination with the series-connected capacitors. The other pair of series-connected transistors remains non-conductive and non-active until one of its transistors is properly triggered, after which point both pairs of transistors oscillate synchronously in ordinary bridge manner.

In the preferred embodiment, the first load amounts to only about 10 Watt and consists of the thermionic cathode in a magnetron. The second load amounts to about 1000 Watt and consists of the magnetron's main anode load. This anode load is connected across the output of a rectifier circuit that, in turn, is connected across the tank capacitor of a series-connected L-C circuit; which series-connected L-C circuit is resonant at the inverter's oscillating frequency and connected between the center-junctions of the two pairs of transistors.

As long as the first load requires but a modest amount of power compared with that of the second load, the total power-handling capability of the dual-mode inverter is effectively determined by the sum total power-handling capabilities of all the four transistors.

DESCRIPTION OF THE PREFERRED EMBODIMENT

Details of Construction

Figure 1:
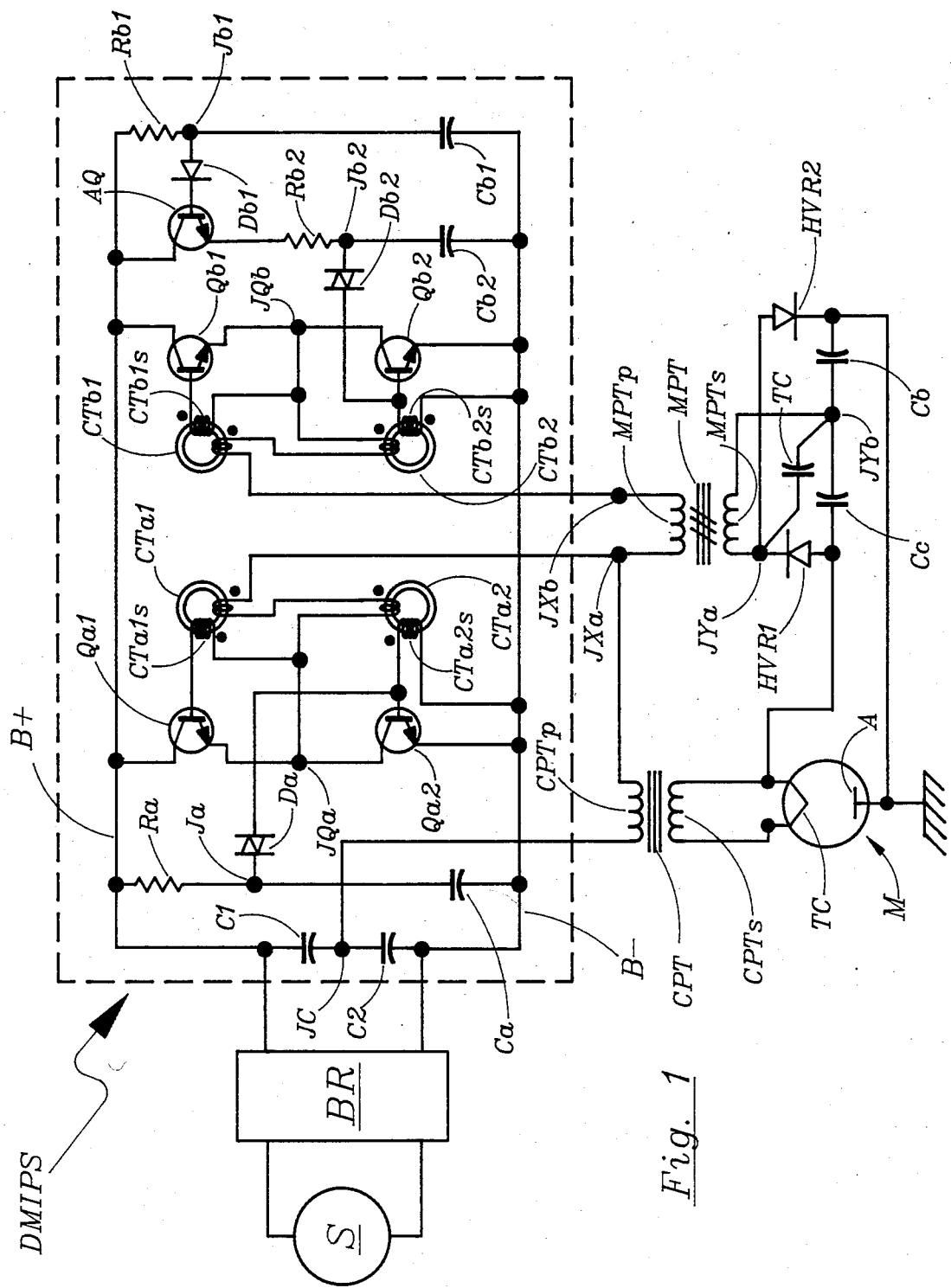
FIG. 1 provides a schematic diagram of the electrical circuitry of the preferred embodiment of the invention.

FIG. 1 shows a source of voltage S, which represents an ordinary 120 Volt/60 Hz electric utility power line. Connected across the output terminals of S, by way of a bridge rectifier BR, is a dual-mode inverter power supply DMIPS. The positive and negative output terminals of bridge rectifier BR provide a DC voltage between a B+ bus and a B− bus, respectively.

A first capacitor C1 is connected between the B+ bus and a junction JC; a second capacitor C2 is connected between junction JC and the B− bus.

The collector of a first transistor Qa1 is connected with the B+ bus; and the emitter of this same transistor is connected with a junction JQa. The collector of a second transistor Qa2 is connected with junction JQa; and the emitter of this same transistor is connected with the B− bus.

The collector of another first transistor Qb1 is connected with the B+ bus; and the emitter of this same transistor is connected with a junction JQb. The collector of another second transistor Qb2 is connected with junction JQb; and the emitter of this same transistor is connected with the B− bus.

The terminals of a secondary winding CTa1s of a first current transformer CTa1 are connected between the base and emitter of transistor Qa1; and the terminals of a secondary winding CTa2s of a second current transformer CTa2 is connected between base and emitter of transistor Qa2. The terminals of a secondary winding CTb1s of another first current transformer CTb1 are connected between the base and emitter of transistor Qb1; and the terminals of a secondary winding CTb2s of another second current transformer CTb2 is connected between base and emitter of transistor Qb2.

The primary windings of current transformers CTa1 and CTa2 are connected in series between a junction JXa and junction JQa; and the primary windings of current transformers CTb1 and CTb2 are connected in series between a junction JXb and junction JQb.

The terminals of primary winding CPTp of a cathode power transformer CPT are connected between junctions JXa and JC. The terminals of secondary winding CPTs of cathode power transformer CPT are connected with the terminals of thermionic cathode TC of a magnetron M.

The terminals of primary winding MPTp of a main power transformer MPT are connected between junctions JXa and JXb. The terminals of secondary winding MPTs are connected between junctions JYa and JYb.

A tank capacitor TC is connected between junctions JYa and JYb. A first high voltage rectifier HVR1 is connected with its cathode to junction JYa; and a second high voltage rectifier HVR2 is connected with its anode to junction JYa. A capacitor Cc is connected between the anode of high voltage rectifier HVR1 and junction JYb; and a capacitor Cb is connected between the cathode of high voltage rectifier HVR2 and junction JYb.

The anode of high voltage rectifier HVR1 is directly connected with the magnetron's thermionic cathode TC; and the cathode of high voltage rectifier HVR2 is directly connected with the magnetron's anode A; which anode is grounded.

A resistor Ra is connected between the B+ bus and a junction Ja. A capacitor Ca is connected between junction Ja and the B− bus. A Diac Da is connected between junction Ja and the base of transistor Qa2.

A resistor Rb1 is connected between the B+ bus and a junction Jb1. A capacitor Cb1 is connected between junction Jb1 and the B− bus. A diode Db1 is connected with its anode to junction Jb1 and with its cathode to the base of an auxiliary transistor AQ. The collector of auxiliary transistor AQ is connected with the B+ bus; and the emitter of auxiliary transistor AQ is connected with a junction Jb2 by way of a resistor Rb2. A capacitor Cb2 is connected between junction Jb2 and the B− bus; and a Diac Db2 is connected between junction Jb2 and the base of transistor Qb2.

The assembly principally consisting of transistors Qa1 and Qa2 and current transformers CTa1 and CTa2 is referred to as the first half-bridge inverter. The assembly principally consisting of transistors Qb1 and Qb2 and current transformers CTb1 and CTb2 is referred to as the second half-bridge inverter. The B+ bus and the B− bus—as well as junction JC, which effectively constitutes a center-tap for the DC supply—are common to the two half-bridge inverters.

Details of Operation

The operation of the magnetron power supply of FIG. 1 is explained as follows.

Within a few milli-seconds after power is applied to dual-mode inverter power supply DMIPS, trigger pulses start being provided to the base of transistor Qa2 by way of the trigger circuit consisting of resistor Ra, capacitor Ca and Diac Da. These trigger pulses initiate conduction of transistor Qa2; which, in turn, starts a cycle of positive feedback by way of saturable current transformers Qa1 and Qa2, thereby initiating the series-connected transistors Qa1 and QA2—as combined with cathode power transformer CPT and center-tapped capacitors C1 and C2—into self-oscillation in manner of an ordinary half-bridge inverter; the operation of which is explained in detail in U.S. Pat. Nos. Re. 31,758 and 4,506,318 to Nilssen.

The output from this first half-bridge inverter, which is a substantially squarewave voltage at a frequency of about 30 kHz, exists without affecting the other pair of series-connected transistors Qb1 and Qb2 (i.e. the second half-bridge inverter)—as long as these Qb1/Qb2 transistors remain non-conductive. And, of course, these other transistors do remain non-conductive for as long as no current is provided to their bases; which is for as long as no trigger pulse is applied to the base of transistor Qb2.

However, some time after trigger pulses started to be provided to the base of transistor Qa1, trigger pulses start to be provided at the base of transistor Qb2 as well; which means that transistor-pair Qb1/Qb2 starts to get involved in the positive feedback cycle and thereby in the inverter action. Thus, from that point and forward, a 30 kHz squarewave output voltage is provided between junctions JXa and JXb. Of course, the output voltage between JXa and JC remains substantially unaffected.

The time required before trigger pulses starts being provided to the base of transistor Qb2 depends on the time it takes to charge capacitor Cb1 to the point where the voltage across it reaches a magnitude high enough to cause auxiliary transistor AQ to start to conduct. Thus, by adjusting the capacitance value of Cb1 and/or the resistance value of Rb1, it is possible to select substantially any desirable amount of delay between the onset of oscillation of the half-bridge inverter consisting of transistors Qa1/Qa2, capacitors C1/C2 and power transformer PT, and the onset of oscillation of the full-bridge inverter consisting of transistors Qa1/Qa2, Qb1/Qb2 and the main load circuit consisting of the resonant L-C circuit and fluorescent lamp FL.

For the preferred embodiment of FIG. 1, the delay time was chosen to be about 5 seconds; which represents the length of time it takes for thermionic cathode TC of magnetron M to reach full thermionic emission.

Thus, after the magnetron's cathode has been heated for about 5 seconds, thereby making the magnetron operative as a load, a 30 kHz squarewave voltage is applied across the primary winding of main power transformer MPT; which, in turn, provides for high-voltage DC power to be applied to the magnetron's anode.

Additional Comments (a) The primary winding of main power transformer MPT is coupled with the secondary winding by way of a "leaky" magnetic path; which implies that the secondary winding will have a substantial output inductance. This output inductance is series-resonated with tank capacitor TC, which implies that the inverter's JXa/JXb output is effectively loaded by a series-connected L-C circuit resonated at 30 kHz.

Thus, if there is no load connected with this L-C circuit, the inverter's JXa/JXb output is effectively short-circuited.

(b) For more information in respect to the operation of a full-bridge self-oscillating inverter, reference is made to U.S. Pat. No. 4,502,107 to Nilssen.

(c) For detailed information in respect to the operation of a series-excited L-C circuit powering a magnetron, reference is made to U.S. Pat. No. 4,593,167 to Nilssen.

(d) The four saturable current transformers CTa1, CTa2, CTb1 and CTb2 are nominally of identical construction.

(e) By placing a control transistor in shunt across the base-emitter junction of transistor Qb2, the oscillation of the full-bridge inverter can be controlled OFF and ON (i.e., stopped and started) by causing that transistor to constitute a substantial short circuit or a substantial open circuit, respectively. The control input would be the base of the control transistor. Of course, even if the full-bridge oscillation were to be disabled in this manner, the half-bridge oscillation would continue unaffectedly.

(f) The full-bridge inverter of FIG. 1 actually consists of two half-bridge inverters, either of which can be made to operate independently of the other, as long as the other is maintained in a non-operative state. When both half-bridge inverters oscillate, they are bound by their common feedback current to operate in synchronism and out-of phase with one another. If required, some other load may be connected between the JXb/JC junctions—in direct correspondence with the load (namely power transformer PT) connected between the JXa/JC junctions.

In other words, the JC junction constitutes a common output terminal for the two half-bridge inverters. Thus, the output from the one half-bridge inverter is from junction JXa with respect to the common terminal JC; and the output from the other half-bridge inverter is from junction JXb with respect to the same common terminal JC.

When both half-bridge inverters are in operation, the output from the then resulting full-bridge inverter is simply between junction JXa and JXb—with the common terminal JC only being operative to provide a return path for any unbalanced AC in the total load. (Of course, such unbalanced AC would result from any load connected with power transformer PT.)

(g) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. A power supply for a magnetron having a thermionic cathode with a pair of cathode power input terminals, the magnetron having a pair of main magnetron power input terminals, the power supply comprising:
    DC terminals adapted to connect with a source of DC voltage;
    first inverter means connected in circuit with the DC terminals and operative, whenever the DC terminals are connected with the source of DC voltage, to provide a first AC voltage at a first set of AC output terminals;
    connect and transformer means operative to permit connection of the cathode power input terminals with the first set of AC output terminals and to provide cathode power thereto;
    second inverter means connected in circuit with the DC terminals and operative after the provision of an initiating action to an initiating input means, whenever the DC terminals are connected with the source of DC voltage, to provide a second AC voltage at a second set of AC output terminals;
    connect, transformation and rectification means operative to permit connection of the main magnetron power input terminals in circuit with both the first set and the second set of AC output terminals, thereby to permit the provision of a current-limited DC voltage to the main magnetron power input terminals from both sets of AC output terminals, but only after the provision of the initiating action;
    cathode power being provided irrespective of any power being provided to the main magnetron power input terminals.

2. The power supply of claim 1 wherein the connect, transformation and rectification means comprises a series-combination of an inductor means and a capacitor means, and where the magnetron is effectively connected in parallel with the capacitor means.

3. The power supply of claim 2 having initiating means connected with the initiating input means, the initiating means providing the initiating action only after AC voltage from the first set of AC output terminals has been provided for a certain period of time.

4. The power supply of claim 3 wherein the certain period of time is on the order of 5 seconds in duration.

5. A power supply for a magnetron having a thermionic cathode with a pair of cathode power input terminals, the magnetron having a pair of main magnetron power input terminals, the power supply comprising:
    a DC source;
    first inverter means connected with the DC source and operative to provide a first AC voltage across a first set of AC output terminals;
    transformer means connected between the cathode power input terminals and the first set of AC output terminals;
    second inverter means connected with the DC source and operative, but only after the provision of an initiating action at an initiating input means, to provide a second AC voltage at a second set of AC output terminals;
    transformation, current-limiting and rectification means connected between the main magnetron power input terminals and both the first set and the second set of AC output terminals, thereby to provide current-limited DC voltage to the main magnetron power input terminals from both sets of AC output terminals, but only after the provision of the initiating action;
    power to the cathode power input terminals being provided irrespective of any power being provided to the main magnetron power input terminals.

6. The power supply of claim 5 wherein the first inverter means comprises a first half-bridge inverter.

7. The power supply of claim 6 wherein: (i) the second inverter means comprises a second half-bridge inverter, and (ii) the first half-bridge inverter is capable of inverter operation independent of the second half-bridge inverter.

8. The power supply of claim 5 combined with initiating means connected with the initiating input means and operative to provide the initiating action, but only after the first AC voltage has been provided at the first set of AC output terminals for a period of time.

9. The power supply of claim 8 wherein the period of time is on the order of 5 seconds.

10. A power supply for a magnetron having a thermionic cathode with a cathode power input, the magnetron having a main magnetron power input, the power supply comprising:

a first inverter connected with a source of DC and operative to provide an AC voltage at a first set of output terminals;

a second inverter connected with a source of DC and operative, but only after having received an initiating action at a control input, to provide an AC voltage at a second set of output terminals;

means connected with the control input and operative controllably to provide the initiating action;

first conditioning means connected between the cathode power input and the first set of output terminals; and second conditioning means connected between the main magnetron power input and both the first and the second set of output terminals;

whereby the cathode power input receives power from the first inverter only, while the main magnetron input receives power only after the second inverter has received the initiating action, and then it receives power in about equal amounts from both inverters.

11. A power supply for a magnetron having a thermionic cathode with a cathode power input manifested by a pair of cathode terminals, the magnetron having a main magnetron power input manifested by a pair of magnetron terminals, the power supply comprising:

first inverter means connected with a source of DC and operative to provide an AC voltage at a first set of output terminals;

second inverter means connected with a source of DC and operative to controllably provide an AC voltage at a second set of output terminals; and connect and conditioning means operative: (i) to connect the cathode terminals in circuit with the first set of output terminals and the magnetron terminals in circuit with both the first and the second set of output terminals, and (ii) to function such that the cathode power input receives power only from the first inverter means irrespective of whether or not the second inverter means provides an AC voltage at the second set of output terminals, while the main magnetron power input receives power only when the second inverter means provides an AC voltage at the second set of output terminals, in which case it receives power in about equal amounts from both inverter means.

12. The power supply of claim 11 wherein the second inverter means is capable of self-oscillation.

13. A power supply for a magnetron having a thermionic cathode with a cathode power input manifested by a pair of cathode terminals, the magnetron having a main magnetron power input manifested by a pair of magnetron terminals, the power supply being operable from a DC voltage and comprising:

a first half-bridge inverter connected with the DC voltage and conditionally operative to provide a first AC voltage at a first set of output terminals;

a second half-bridge inverter connected with the DC voltage and operative to provide a second AC voltage at a second set of output terminals, this second half-bridge inverter being capable of inverter operation independent of the state of operation of the first half-bridge inverter;

first means connected with both the first and the second set of output terminals and operative to connect with the magnetron terminals, thereby to provide magnitude-limited unidirectional current to the main magnetron power input; and second means connected with the second set of output terminals and operative to connect with the cathode terminals, thereby to provide power to the cathode power input;

such that, when both half-bridge inverters are engaged in inverter operation, they operate jointly in the form of a full-bridge inverter and provide power to both the main magnetron power input as well as to the cathode power input, but when only the second half-bridge is engaged in inverter operation, it operates in the manner of a single half-bridge inverter and then provides power only to he cathode power input.

14. The power supply of claim 13 combined with control means operative to permit control of the operation of the first half-bridge inverter.

15. The power supply of claim 13 wherein both half-bridge inverters are of the self-oscillating type.

16. A power supply for a magnetron having: (i) a thermionic cathode, (ii) cathode power input means manifested by a set of cathode power input terminals, and (iii) main magnetron power input means manifested by a set of main magnetron power input terminals, the power supply comprising:

a DC source operative to provide a DC voltage;

first inverter means connected with the DC source and operative, but only when the DC voltage is indeed provided, to provide a first AC voltage at a first set of AC output terminals;

second inverter means connected with the DC source and operative, but only when the DC voltage is indeed provided, and then only after having been provided with an initiating action at a control input, to provide a second AC voltage at a second set of AC output terminals;

control means operative to controllably provide the initiating action to the control input;

first means operative to connect the cathode power input terminals with the first set of AC output terminals, thereby to provide cathode heating power to the cathode power input means whenever the DC voltage is provided and whenever the cathode power input terminals are so connected; and second means operative to connect the main magnetron power input terminals in circuit with both the first and the second set of output terminals, thereby to provide main magnetron power to the main magnetron power input means whenever the DC voltage is provided and whenever the main magnetron power input terminals are so connected, but only when the second AC voltage is indeed provided at the second set of output terminals;

such that main magnetron power is only provided to the main magnetron power input means after the initiating action has been provided by the control means.

17. The power supply of claim 16 wherein the control means is adapted automatically to provide the initiating action a brief period after the DC voltage has been provided.

18. The power supply of claim 17 wherein the brief period is on the order of 5 seconds in duration.

19. The power supply of claim 16 wherein the frequency and waveshape of the first AC voltage is equal to the frequency and waveshape of the second AC voltage.

20. The power supply of claim 19 wherein the phase of the first AC voltage is opposite to that of the second AC voltage.

* * * * *